United States Patent
Imanaka

(10) Patent No.: US 8,331,233 B2
(45) Date of Patent: Dec. 11, 2012

(54) COMMUNICATION PATH CONTROL APPARATUS FOR EVENLY DISTRIBUTING PACKETS BETWEEN ADJACENT NODES AND A METHOD THEREFOR

(75) Inventor: Norihiro Imanaka, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 288 days.

(21) Appl. No.: 12/923,212

(22) Filed: Sep. 9, 2010

(65) Prior Publication Data

US 2011/0116397 A1    May 19, 2011

(30) Foreign Application Priority Data

Nov. 18, 2009  (JP) ................................. 2009-263186

(51) Int. Cl.
*H04J 3/14* (2006.01)
*H04L 12/26* (2006.01)
*G06F 15/173* (2006.01)
(52) U.S. Cl. .......................... 370/230; 370/252; 709/242
(58) Field of Classification Search .................. None
See application file for complete search history.

(56) References Cited

U.S. PATENT DOCUMENTS 6,282,197 B1 * 8/2001 Takahashi et al. ......... 370/395.1
2005/0129005 A1 * 6/2005 Srikrishna et al. ............ 370/356

OTHER PUBLICATIONS

Ye et al, Effects of Multipath Routing on TCP Performance in Ad Hoc Networks, Nov. 2004, IEEE.*
Srikanth Kandula et al., "Dynamic Load Balancing Without Packet Reordering" ACM SIGCOMM Computer Communication Review, vol. 37, No. 2, Apr. 2007.

* cited by examiner

*Primary Examiner* — Andrew Chriss
(74) *Attorney, Agent, or Firm* — Rabin & Berdo, P.C.

(57) ABSTRACT

In a packet transfer network node, the receiving ratio of first packets transmitted from its adjacent node is calculated to represent a proportion of the number of the first packets received from each adjacent node to the total number of those packets received from all adjacent nodes. Based on the receiving ratio calculated for a combination of a source and a destination corresponding to the destination and source of the second packets, respectively, the transmitting ratio of second packets is calculated for each adjacent node to define a proportion in which the second packets transmitted from a source corresponding to the destination of the first packets and meant for a destination corresponding to the source of the first packets are to be transmitted to an adjacent communication node. Based upon the transmitting ratios thus calculated, an adjacent node is selected to which a second packet is to be transmitted.

9 Claims, 11 Drawing Sheets

| DESTINATION (8022) | METRIC (8024) | NEXT HOP NODE (8026) |
|---|---|---|
| H1 | 2 | R1 |
| H2 | 3 | R4 |
| H2 | 3 | R5 |

| SOURCE (8042) | DESTINATION (8044) | ROUTER (8046) | RECEIVING RATIO (8048) |
|---|---|---|---|
| H2 | H1 | R4 | 2/3 |
| H2 | H1 | R5 | 1/3 |

| SOURCE (8062) | DESTINATION (8064) | ROUTER (8066) | TRANSMITTING RATIO (8068) |
|---|---|---|---|
| H1 | H2 | R4 | 2/3 |
| H1 | H2 | R5 | 1/3 |

| SOURCE (8082) | DESTINATION (8084) | ROUTER (8086) | PACKET TRANSMITTING AMOUNT (8088) |
|---|---|---|---|
| H1 | H2 | R4 | 19 |
| H1 | H2 | R5 | 10 |

COMMUNICATION PATH CONTROL APPARATUS FOR EVENLY DISTRIBUTING PACKETS BETWEEN ADJACENT NODES AND A METHOD THEREFOR

BACKGROUND OF THE INVENTION

1. Field of the Invention

The present invention relates to a communication path control apparatus and a method therefor, and, more particularly, to a packet transfer path control apparatus and a method therefor for selecting packet transfer paths minimizing the possibility of packets arriving at a destination in the order different from the order in which they were transmitted.

2. Description of the Background Art

In packet communication in which data are transmitted in the form of packets, a multiple-path transmission system is generally adopted. The multiple-path transmission environment involves a problem in that, if a lot of packets to deal with are bunched to a specific node on a packet transmission network, they may arrive at destinations with more delay than the packets routed through other nodes.

Therefore, routers, or nodes, constituting a packet transfer network are adapted, when connected to plural adjacent routers, to transmit received packets to the adjacent routers in such a way that the traffic load of packets to be transmitted is equally shared between the adjacent routers. For example, in the simplest method, a router assigns packets equally in number between all its adjacent routers. As an alternative solution, Srikanth Kandula et al., "Dynamic Load. Balancing Without Packet Reordering" ACM SIGCOMM Computer Communication Review, Vol. 37, No. 2, April 2007 discloses a method in which the first branch for packets to be transmitted on a packet transfer network controls the order of transmitting packets so that individual routs equally share the load therebetween.

However, there may be a case where packets routed on plural paths will be congested at another node on the network. In such a case, if routers equally distribute packets between all the adjacent routers, a number of packets may concentrate on a router located at a junction of the plural routs near the destination thereof. Therefore, there is a possibility that the router at the junction delays in processing the packets thus concentrated, thus causing a difficulty that the packets transmitted would not reach the destination in the order different from the order in which they were transmitted.

For example, a case will be described where data are transmitted from a source host to a destination host over a packet transfer network, which includes seven routers, or nodes, R1 to R7, which are adapted to evenly distribute received packets between routers adjacent thereto to which they will be transferred. For example, the source host transmits 60 packets meant for the destination host to the first router R1, which in turn receives the 60 packets and evenly distributes them between the routers R2 and R3 that are adjacent to the router R1 towards the destination thereof. In turn, each of the routers R2 and R3 receives 30 packets. On one hand, the router R2 evenly distributes the 30 packets received between the routers R4 and R5 that are adjacent to the router R2 towards the destination to transmit 15 packet to each of the routers R4 and R5. On the other hand, the router R3 receives 30 packets and evenly distributes the latter between the routers R5 and R6 adjacent to the router R3 towards the destination to transmit 15 packets to each of the routers R5 and R6. Each of the routers R4 and R5 receives 15 packets from the router R2 while each of the routers R5 and R6 receives 15 packets from the router R3. In this example, as may be noted, the router R5 is interconnected to both of the routers R2 and R3, so that the router R5 is located at the junction of the routes passing through the routers R1 and R2 and through the routers R1 and R3. The router R5 thus receives 30 packets in total from the routers R2 and R3 whereas the routers R4 and R6 receive 15 packets each from the routers R2 and R3, respectively.

In this way, the packets transmitted over the routes through the router R5, i.e. the routes passing through the routers R1, R2, R5 and R7, and through the routers R1, R3, R5 and R7, concentrate on the router R5, so that the router R5 may be caused to delay the processing of those packets. Therefore, there is a higher possibility that the packets transmitted through the router R5 arrive at the destination host in delay against the other packets transmitted without passing the router R5, i.e. on the routes passing the routers R1, R2, R4 and R7, and through the routers R1, R3, R6 and R7. That may cause the packets to be received in the order different from the order in which they are transmitted from the source host, thus requiring the packets received to be reordered.

SUMMARY OF THE INVENTION

It is therefore an object of the present invention to provide a novel and improved communication path control apparatus and a method therefor of selecting packet transfer paths with a possibility minimized in which packets are received by a destination terminal in the order different from the order in which they are transmitted from a source terminal.

In accordance with the present invention, a communication path control apparatus for use in a communication node forming a packet transfer network together with other communication nodes comprises: a receiving ratio calculator that calculates a receiving ratio of first packets received from each of the communication nodes adjacent to the communication node on which the apparatus is provided, the receiving ratio being calculated with respect to each of combinations of a source and a destination involved in the first packets and representing a proportion of a number of the first packets received from each of the adjacent communication nodes to a total number of the first packets received from all of the adjacent communication nodes; a transmitting ratio calculator that calculates a transmitting ratio of second packets for each of the adjacent communication nodes on the basis of the receiving ratio calculated for a combination of a source and a destination corresponding to the destination and the source of the second packets, respectively, the transmitting ratio defining a proportion in which the second packets transmitted from a source corresponding to the destination of the first packets and meant for a destination corresponding to the source of the first packets are to be transmitted to one of the adjacent communication nodes; and a route selector that selects one of the adjacent communication nodes, to which the second packet is to be transmitted, on the basis of the transmitting ratios calculated.

According to the present invention, an adjacent node, to which a second packet, such as a data packet, is to be transmitted, is selected on the basis of the receiving ratio of the first packets, such as ACK packets, for the adjacent node. That renders the possibility extensively increased in which a node located at a junction of packet transfer routes has substantially the same amount of packets to be dealt with as other nodes having the same number of hops from the source as the junction node. The route selector can select routes such as to minimize the possibility of packets arriving at a destination in the order different from the order in which they were transmitted.

In an aspect of the invention, the apparatus may further comprise a transmitting amount calculator that calculates a packet transmitting amount of the second packets on the basis of information on the adjacent communication node selected by the route selector, the transmitting amount being calculated with respect to each of the adjacent communication nodes, the route selector selecting one of the adjacent communication nodes to which the second packet is to be transmitted such that the packet transmitting amount calculated satisfies the transmitting ratio.

In another aspect of the invention, the route selector may select the adjacent communication nodes to which the first packets are to be transmitted such that the first packets will be distributed substantially evenly in number between candidate adjacent communication nodes to which the first packets are to be transmitted.

In still another aspect of the invention, for the adjacent communication node, the transmitting ratio calculator may reduce or increase the transmitting ratio if the transmitting ratio is larger or smaller than the receiving ratio, respectively.

In a further aspect of the invention, the transmitting ratio calculator may set the transmitting ratio and the receiving ratio to be substantially equal to each other for the adjacent communication node.

In a still further aspect of the invention, the first packet may be an acknowledgement (ACK) packet compliant with a transmission control protocol (TCP), and the second packet may be a data packet compliant with the TCP.

In a yet another aspect of the invention, the first packet may be a real-time transport control protocol (RTCP) packet, and the second packet may be a real-time transfer protocol (RTP) packet.

Further in accordance with the present invention, a method of controlling a communication path in a communication path control apparatus for use in a communication node forming a packet transfer network together with other communication nodes to select a communication node which is adjacent to the communication node having the apparatus provided thereon and to which a packet received from another adjacent communication node is to be transmitted comprises the steps of: causing a receiving ratio calculator to calculate a receiving ratio of first packets received from each of the adjacent communication nodes, the receiving ratio being calculated with respect to each of combinations of a source and a destination involved in the first packets and representing a proportion of a number of the first packets received from each of the adjacent communication nodes to a total number of the first packets received from all of the adjacent communication nodes; causing a transmitting ratio calculator to calculate a transmitting ratio of second packets for each of the adjacent communication nodes on a basis of the receiving ratio calculated for a combination of a source and a destination corresponding to the destination and the source of the second packets, respectively, the transmitting ratio defining a proportion in which the second packets transmitted from a source corresponding to the destination of the first packets and meant for a destination corresponding to the source of the first packets are to be transmitted to one of the adjacent communication nodes; and causing a route selector to select one of the adjacent communication nodes, to which the second packet is to be transmitted, on the basis of the transmitting ratios calculated.

In accordance with present invention, packet transmitting routes can be selected such as to minimize the possibility of packets arriving at a destination in the order different from the order in which they were transmitted.

The inventive concept disclosed in the application may also be defined in ways other than in the claims presented below.

The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which:

FIG. 5 shows an example of routing table of the packet transfer path controller shown in FIG. 4;

FIG. 6 shows an example of receiving ratio information of the packet transfer path controller shown in FIG. 4;

FIG. 7 shows an example of transmitting ratio information of the packet transfer path controller shown in FIG. 4;

FIG. 8 shows an example of packet transmitting amount information of the packet transfer path controller shown in FIG. 4;

DESCRIPTION OF THE PREFERRED EMBODIMENT

With reference to the accompanying drawings, a preferred embodiment of the present invention will be described in detail. At first, in order to facilitate understanding how a packet transfer path controller 100 according to the preferred embodiment controls packet routing, the packet transmission on a packet transfer network including the packet transfer path controllers 100 will be overviewed with reference to FIGS. 1, 2 and 3. Like components are given the same reference numbers.

The instant illustrative embodiment is operable under the TCP (Transmission Control Protocol) in which acknowledgement (ACK) packets are transmitted in response to data packets when received by a destination terminal. The present invention is, however, not restricted to such a specific embodiment but is applicable to, for example, steaming communications transmitting RTP (Real-time Transport Protocol) packets and RTCP (Real-time Transport Control Protocol) packets in reply to RTP packets. For the purpose of description, with the examples stated above, a packet, such as ACK and RTCP packets, transmitted from a source terminal to a destination terminal may sometimes be referred to as a "first packet" while a packet, such as data and RTP packets, transmitted with its destination and source specified to the source and destination terminals, respectively, of the second packet is referred to a "second packet".

Figure 1:
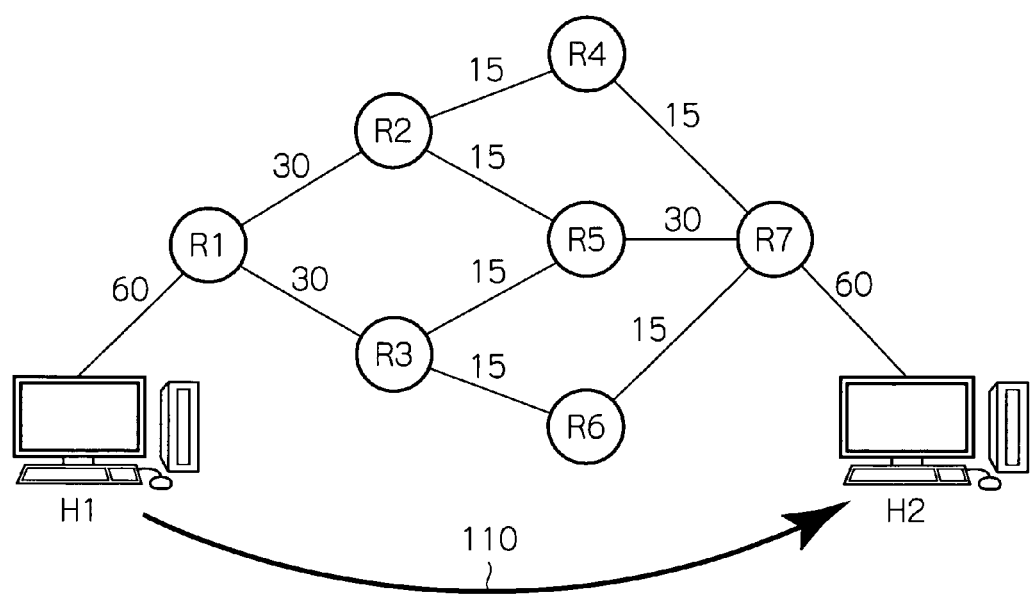
FIG. 1 exemplarily shows how data packets are initially transmitted on a packet transfer network, which includes packet transfer path controllers according to a preferred embodiment of the present invention.

For example, FIG. 1 shows an exemplified state of data packets, conceptually designated with a reference numeral 110, transmitted from one host H1 to another host H2 over a telecommunications network, such as a packet transfer network, operable under the TPC and formed by seven communication network nodes, or routers, R1 through R7, each of which includes the packet transfer path controllers 100. The hosts H1 and H2 may be terminal devices, such as personal computers. In the initial state, each packet transfer path controller 100 evenly distributes packets, when it received, between its adjacent routers to which they will be forwarded. More generally, the packet transfer path controller 100 evenly distributes communication load between its adjacent routers. In the context, an adjacent router or node means a router or node to which a router or node of interest may directly transmit a packet, namely without intervening any other router or node in between.

For example, when the one host H1 transmits 60 packets destined to the other host H2 to the router R1, which in turn receives the 60 packets and evenly distributes them between the routers R2 and R3. Thus, each of the routers R2 and R3 receives 30 packets. On one hand, the router R2 evenly distributes the packets between the routers R4 and R5 to transmit 15 packets to each of the routers R4 and R5. On the other hand, the router R3 receives 30 packets and evenly distributes the 30 packets thus received between the routers R5 and R6 to transmit 15 packets to each of the routers R5 and R6. In this case, the router R5 is located at the junction of the routes formed through the routers R1 and R2 and through the routers R1 and R3. In other words, the router R5 receives 15 packets from the router R2 and 15 packets from the router R3 whereas the routers R4 and R6 receive 15 packets each from the routers R2 and R3, respectively.

In the initial state described above, the packets 114 may concentrate on the router R5 as in the above-described conventional example, thus resulting in a high possibility that the packets may be transmitted through the router R5 with delay to the destination host H2. Thereafter, however, the packet transfer path controllers 100 included in those routers proceed to controlling route or path selection for data packet transmission on the basis of how ACK packets are transmitted.

Figure 2:
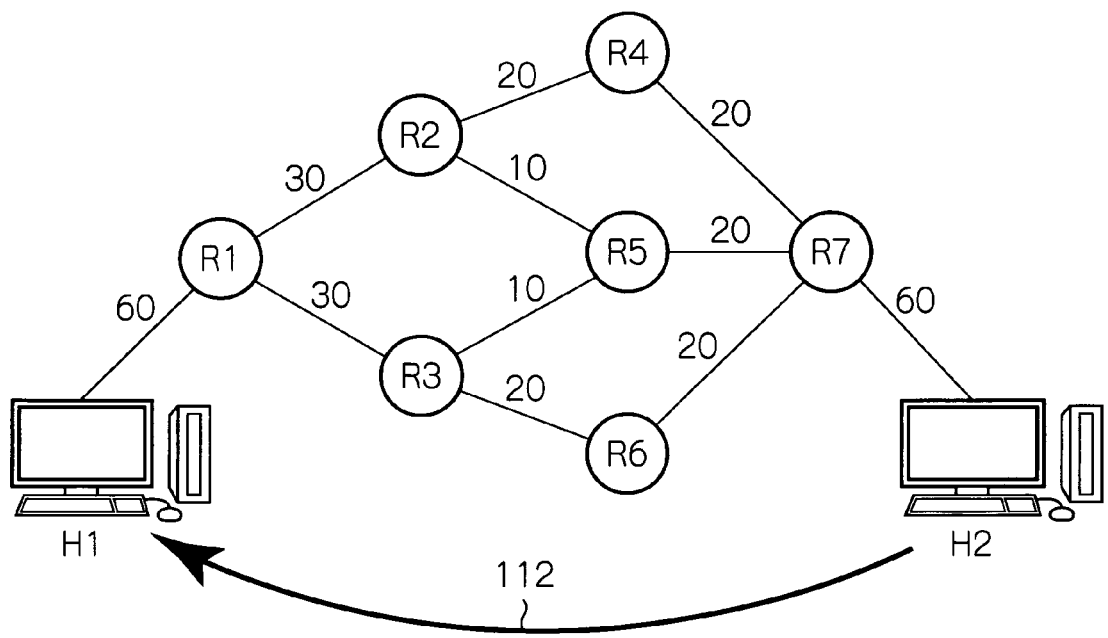
FIG. 2 exemplarily shows how acknowledgement (ACK) packets are transmitted on the network shown in FIG. 1.

Now, with reference to FIG. 2, the host H2 is in response to the data packets 110, when received, to transmit ACK packets 112 to the host H1. In the instant embodiment, the packet transfer path controller 100 provided in each router receives some of those ACK packets 112 and evenly distributes the ACK packets 112 between its adjacent routers to which they will be transferred. Specifically, the ACK packets 112 are distributed and routed as shown in FIG. 2 to be ultimately transmitted to the host H1.

In the following stage, with the illustrative embodiment, when the host H1 further transmits data packets 114, the packet transfer path controllers 100 provided on the nodes R1 through R7 distribute the data packets 114 thus transmitted by the host H1 on the basis of how the ACK packets 112 have been transmitted from the host H2, as exemplified in FIG. 3.

Figure 3:
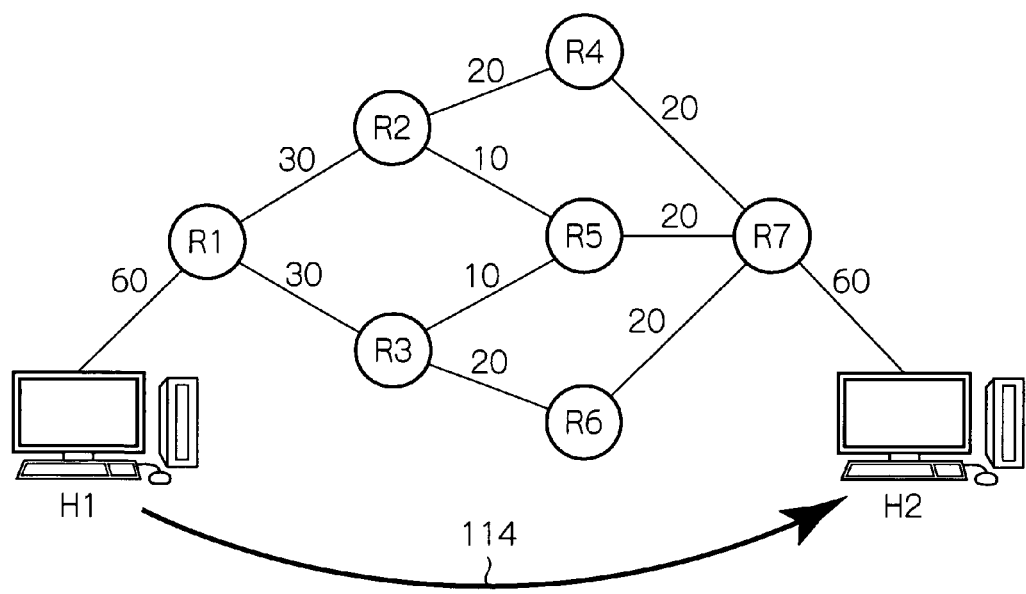
FIG. 3 exemplarily shows how data packets are transmitted after the initial stage on the network shown in FIG. 1.

Specifically in the state shown in FIG. 3, as apparent from comparison of FIG. 3 to FIG. 1, the router R2, for example, receives 30 packets from the router R1 and distributes thereamong 20 packets to the router R4 and 10 packets to the router R5. More specifically, the packet transfer path controller 100 in the router R2 has a record therein which shows that it received 20 ACK packets 112 from the router R4 and 10 ACK packets 112 from the router R5 in connection with the packet transfer between the hosts H1 and H2. The router R2 distributes data packets 114 received from the router R1 in connection with the packet transfer between the hosts H1 and H2 on the basis of that record. Similarly, the router R3 receives 30 packets also from the router R1 and distributes thereamong 10 packets to the router R5 and 20 packets to the router R6. Consequently, the router R5 receives 20 packets in total, and each of the routers R4 and R6 also receives 20 packets, the same amount. According to the above-described packet distribution method, a junction router, such as the router R5, located at the joint point of plural packet transmission paths controls itself so as to receive packets substantially the same in number as other routers having the same number of hops to the destination as the junction router, thus rendering the junction router to process the packets with a delay substantially comparable to the other routers.

It has been overviewed how the packet transfer network including the packet transfer path controllers 100 transmits and routes packets. The configuration of the packet transfer path controller 100 implementing such packet transmission on the network will be described with reference to FIG. 4.

Figure 4:
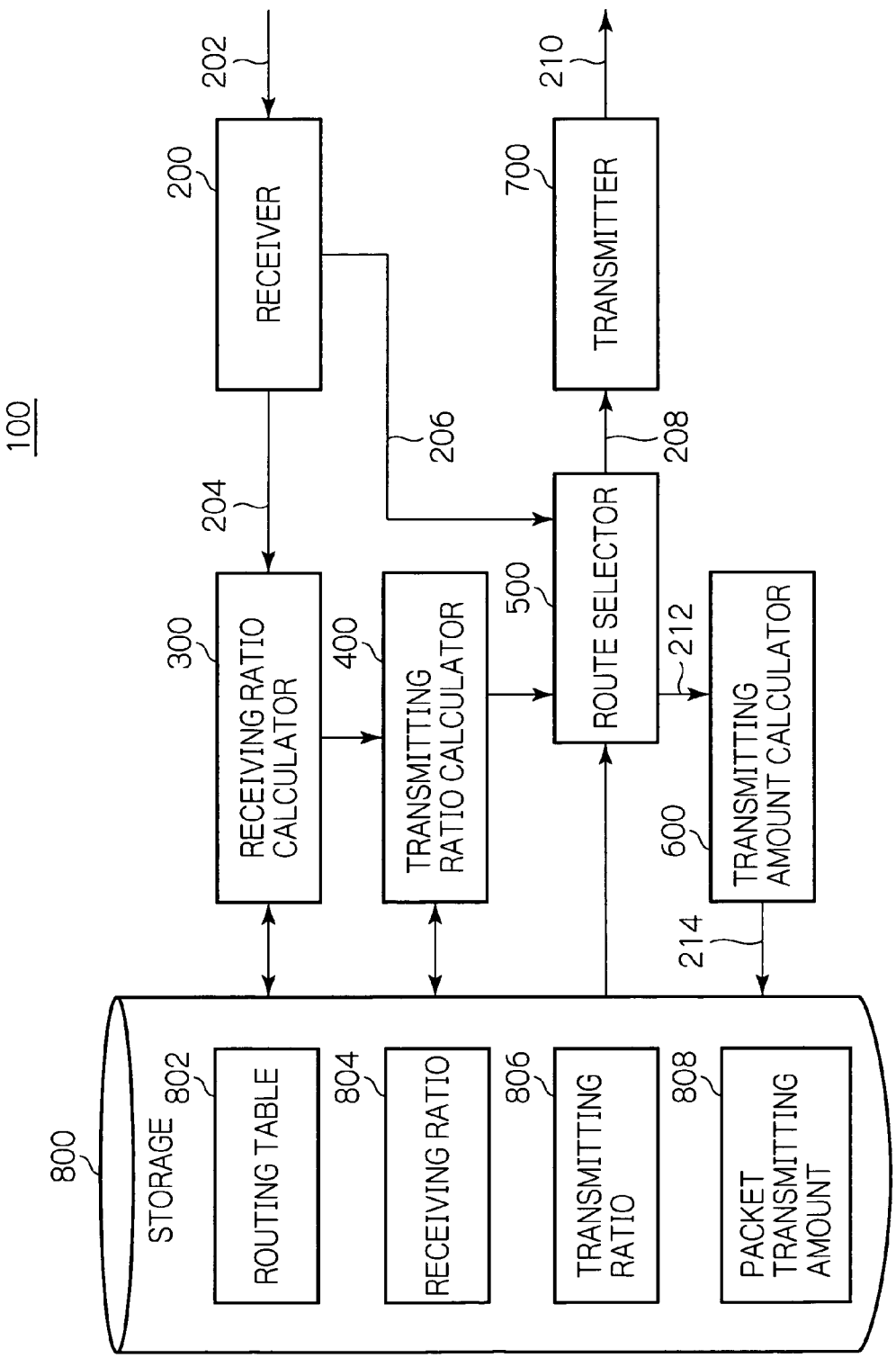
FIG. 4 is a functional block diagram showing the packet transfer path controller according to the embodiment.

FIG. 4 schematically shows the functional configuration of the packet transfer path controller 100, which is adapted for controlling communication paths and thus may be a router per se. The packet transfer path controller 100 generally includes a receiver 200, a receiving ratio calculator 300, a transmitting ratio calculator 400, a route selector 500, a transmitting amount calculator 600, a transmitter 700 and a data storage 800, which are interconnected as depicted.

The illustrative embodiment of the packet transfer path controller 100 is depicted and described as configured by separate functional blocks, such as route selector 500. It is however to be noted that such a depiction and a description do not restrict the controller 100 to an implementation only in the form of hardware but may partially or entirely be implemented by software, namely, by a computer, or processor system, which has a computer program installed and functions, when executing the computer program, as part of, or the entirety of, the controller 100. In this connection, the word "circuit" or "circuitry" may be understood not only as hardware, such as an electronics circuit, but also as a function that may be implemented by software installed and executed on a computer.

The receiver 200 is connected to the packet transfer network to receive on its input 202 packets from adjacent communication devices, such as routers, over the network. In the description, signals or data are designated with reference numerals of connections on which they are conveyed. As described above, in this embodiment, packets received by the receiver 200 may be ACK packets referred to as first packets and data packets as second packets.

The ACK and data packets include destination and source information fields. The destination and source information fields include an identification (ID), such as an IP (Internet Protocol) address, a node ID, the prefix of an IP address or an AS (Autonomous System) number. Destination and source information identifies the destination and source of a packet, respectively. So long as a destination and a source can be identified from destination and source information, respectively, both pieces of information included in the same packet may not be of the same type of identification. For example, destination information can be given by an IP address, and source information by a node ID.

The receiver 200 is adapted to obtain such destination and source information as well as router information to identify an adjacent router from which the receiver 200 receives a packet. From the information, the receiver 200 determines whether the received packet is an ACK packet or a data packet. If the received packet is an ACK packet, the receiver 200 feeds its router, destination and source information 204 to the receiving ratio calculator 300. By contrast, if the received packet is a data packet, the receiver 200 feeds the router, destination and source information 206 to the route selector 500.

The receiving ratio calculator 300 has a function for calculating the ratio, or proportion, of received ACK packets between its neighboring router or routers. Specifically, the receiving ratio calculator 300 calculates a receiving ratio on the basis of the router, destination and source information 204 provided by the receiver 200 as well as receiving ratio information 804 stored in the storage 800, which will be described later. With the illustrative embodiment, the receiving ratio represents the ratio, or proportion, of the number of ACK packets the receiver 200 has received from an adjacent router of interest to the total number of ACK packets the receiver 200 has received from all adjacent routers in connection with a specific source of the ACK packets in a predetermined period of time. The receiving ratio may be calculated on ACK packets with respect to a combination of a specific source and a specific destination. The calculation may be made, rather than such a predetermined period of time, on all ACK packets the receiver 200 has so far received in connection with a specific source. The receiving ratio calculator 300 stores the resulting receiving ratios thus calculated in the storage 800 as receiving ratio information 804.

The transmitting ratio calculator 400 has a function for calculating, or defining, a transmitting ratio, or proportion, between its adjacent router or routers, of data packets to be transmitted. The transmitting ratio represents the ratio, or proportion, of the number of data packets to be transmitted to specific one of its adjacent routers to the number of data packets the router receives. Similarly to the receiving ratio, the transmitting ratio may be calculated on data packets with respect to a combination of a specific source and a specific destination.

More specifically, the transmitting ratio calculator 400 refers to receiving ratios with respect to its adjacent router or between its adjacent routers calculated on ACK packets having the source and destination thereof corresponding to the destination and source of data packets thus received, respectively, to calculate the transmitting ratios with respect to the adjacent router or between the adjacent routers. In the stage shown in FIG. 1, for example, the transmitting ratios of data packets to be transmitted from the host H1 to the host H2 are calculated on the basis of the receiving ratios of the ACK packets transmitted from the host H2 to the host H1. If no transmitting ratios with respect to an adjacent router or between adjacent routers have been calculated yet on the basis of receiving ratios, namely no receiving ratios are available yet, the predefined initial values for transmitting ratios may then be used to transmit data packets. For example, the initial values for the transmitting ratios may be predefined such that data packets will be transmitted evenly in number between adjacent routers.

The transmitting ratio calculator 400 usually updates the transmitting ratios, as will exemplarily be described below. For example, one router #1 calculates the receiving ratio $\alpha_{1,2}$ on packets received from another router #2 adjacent thereto with respect to a combination of a source P and a destination Q. In addition, the router #1 defines the transmitting ratio $\beta_{1,2}$ on packets to be transmitted to the other router #2 with respect to a reverse combination of a source Q and a destination P associated with the receiving ratio $\alpha_{1,2}$. The transmitting ratio calculator 400 of the one router #1 compares the transmitting ratio $\beta_{1,2}$ for transmission to the other router #2 with the receiving ratio for reception from the other router #2. When the transmitting ratio $\beta_{1,2}$ is larger than the receiving ratio $\alpha_{1,2}$, the transmitting ratio calculator 400 of the one router #1 reduces the transmitting ratio $\beta_{1,2}$. When the transmitting ratio $\beta_{1,2}$ is smaller than the receiving ratio $\alpha_{1,2}$, the transmitting ratio calculator 400 increases the transmitting ratio $\beta_{1,2}$.

The transmitting ratio calculator 400 can update the transmitting ratio in accordance with the following expression:

$$\beta_{1,2}(t+1)=\alpha_{1,2}(t). \tag{1}$$

Alternatively, the following expressions (2) and (3) may be applied:

$$\gamma_{1,i}(t)=\beta_{1,i}(t)*(1+\alpha_{1,i}(t)-\beta_{1,i}(t)), \tag{2}$$

$$\beta_{1,2}(t+1)=\gamma_{1,2}(t)/\Sigma_i\gamma_{1,i}(t), \tag{3}$$

where "i" represents the number of a router i adjacent to the router #1 of interest.

Well, the route selector 500 has a function to determine which adjacent router a received packet is to be transmitted to in accordance with a type of the received packet. If the received packet is an ACK packet, then the route selector 500 refers to a routing table 802 stored in the storage 800 to select an adjacent router to which the ACK packet is to be transmitted. By contrast, if the received packet is a data packet, then the route selector 500 uses destination and source information 204 provided by the receiver 200 as well as packet transmitting amount information 808 and transmitting ratio information 806 stored in the storage 800 to select an adjacent router to which the data packet is to be transmitted.

More specifically, the route selector 500 refers to the storage 800 with a combination of the destination and source 204 provided by the receiver 200 used as a searching key to thereby obtain the packet transmitting amount information 808 regarding that combination therefrom. In addition, the route selector 500 references the transmitting ratio information 806 to obtain the transmitting ratios regarding that combination of the destination and source 204 provided by the receiver 200. The route selector 500 selects an adjacent router to which the data packet is to be transmitted such that the packet transmitting amount 808, which may be timely updated as described below, may approach the obtained transmitting ratio.

The transmitting amount calculator 600 is adapted to use identification information of an adjacent router determined by the route selector 500, and source and destination information of packets fed from the receiver 200 to calculate the amount, e.g. number, of data packets transmitted, or, more exactly, scheduled to be transmitted, with respect to each of the adjacent routers and with respect to each of combinations of a source and a destination to thereby timely update the packet transmitting amount information 808 in the storage 800.

The transmitter 700 has a function to transmit the received packet to the adjacent router, thus determined by the route selector 500, to which they will be forwarded.

The data storage 800 predominantly includes data storage areas for the routing table 802, the receiving ratio information 804, the transmitting ratio information 806, and the packet transmitting amount information 808. For purpose of illustration, the router R2 on the network shown in FIG. 1 will be taken as an example to describe exemplified details of information in the storage 800 with reference to FIGS. 5 to 8.

FIG. 5 explanatorily shows an example of routing table 802 of the router R2 on the network shown in FIG. 1. The routing table 802 generally includes items, or storage fields, "destination" 8022, "metric" 8024, and "next hop node" 8026. The item "metric" 8024 shows the minimum number of hops from the router R2 of interest in this example to the destination indicated by the item 8022.

FIG. 6 explanatorily shows an example of receiving ratio information 804 of the router R2 in FIG. 1. The receiving ratio information 804 generally includes items "source" 8042, "destination" 8044, "router" 8046, and "receiving ratio" 8048. By referring to the receiving ratio information 804 with respect to a specific combination of a source and a destination indicated in the items "source" 8042 and "destination" 8044, respectively, of packets the router R2 has so far received, the item "receiving ratio" 8048 can define the ratio of packets the router R2 has received from an adjacent router indicated in the item "router" 8046 to the packets the router R2 has received from all the adjacent routers. According to FIG. 6, the router R2 has received from the router R4 two-thirds of the total number of ACK packets transmitted from the host H2 and destined to the host H1, and one-third from the router R5.

FIG. 7 explanatorily shows an example of transmitting ratio information 806 of the router R2 in FIG. 1. The transmitting ratio information 806 generally includes items "source" 8062, "destination" 8064, "router" 8066, and "transmitting ratio" 8068. The transmitting ratio information 806 represents a transmitting ratio of data packets of interest calculated on the basis of the receiving ratio information 804 associated with ACK packets having the destination and source thereof corresponding to the source and destination of the data packets of interest, respectively.

FIG. 8 explanatorily shows an example of packet transmitting amount information 808 of the router R2 in FIG. 1. The packet transmitting amount information 808 generally includes items "source" 8082, "destination" 8084, "router" 8086, and "packet transmitting amount" 8088. The packet transmitting amount information 808 indicates the number of packets which have the source and destination thereof indicated by the items "source" 8082 and "destination" 8084, respectively, and which the router R2 has transmitted to a router indicated by the item "router" 8086 during a predetermined period of time.

Figure 9:
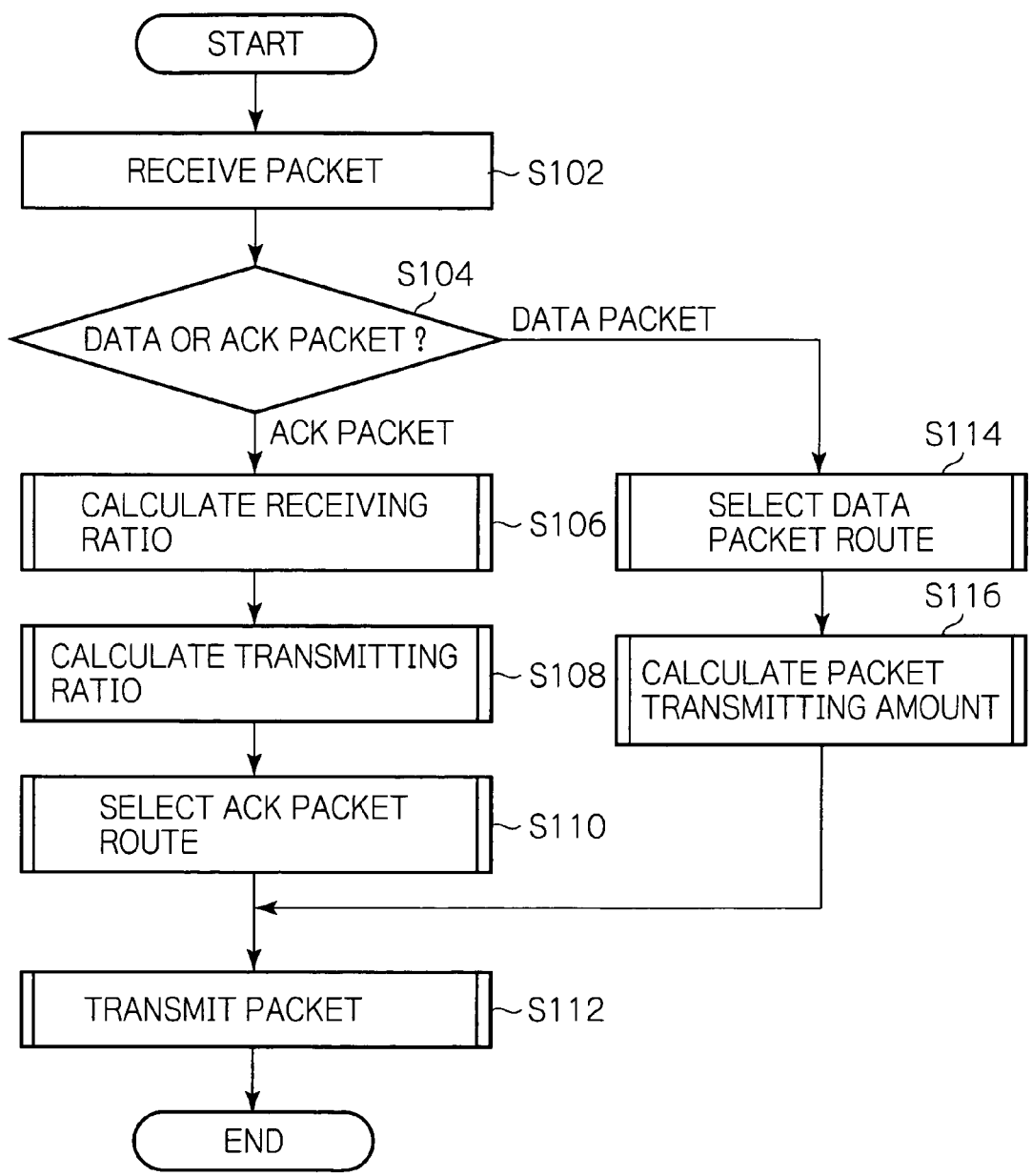
FIG. 9 is a flowchart useful for understanding the entire control flow of processing packets in the packet transfer path controller shown in FIG. 4.

Next, an example of behavior of the packet transfer path controller 100 will be described with reference to FIGS. 9 to 14. FIG. 9 is a flowchart useful for understanding the entire behavior of the packet transfer path controller 100. FIGS. 10 to 14 show sub-flows included in the flow shown in FIG. 9. The entire behavior of the packet transfer path controller 100 will be described primarily with reference to FIG. 9 with sometimes appropriate sub-flowcharts referred to if necessary.

At first, with reference to FIG. 9, the receiver 200 of the packet transfer path controller 100 receives a packet 202 from an adjacent router (S102). Next, the receiver 200 determines whether the received packet is a data packet or an ACK packet, while obtaining router identification, source and destination information therefrom (S104).

Figure 10:
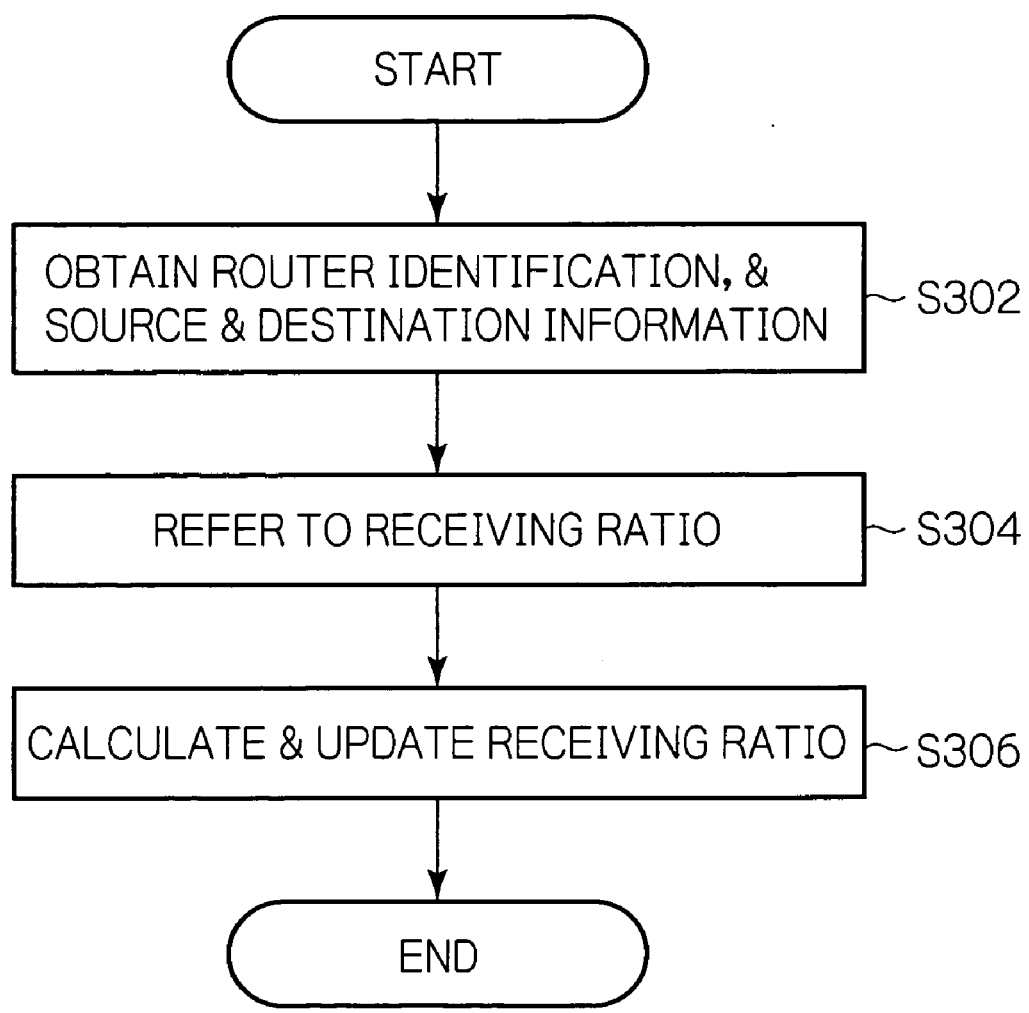
FIG. 10 is a flowchart useful for understanding the process flow of the receiving ratio calculator shown in FIG. 4.
Figure 11:
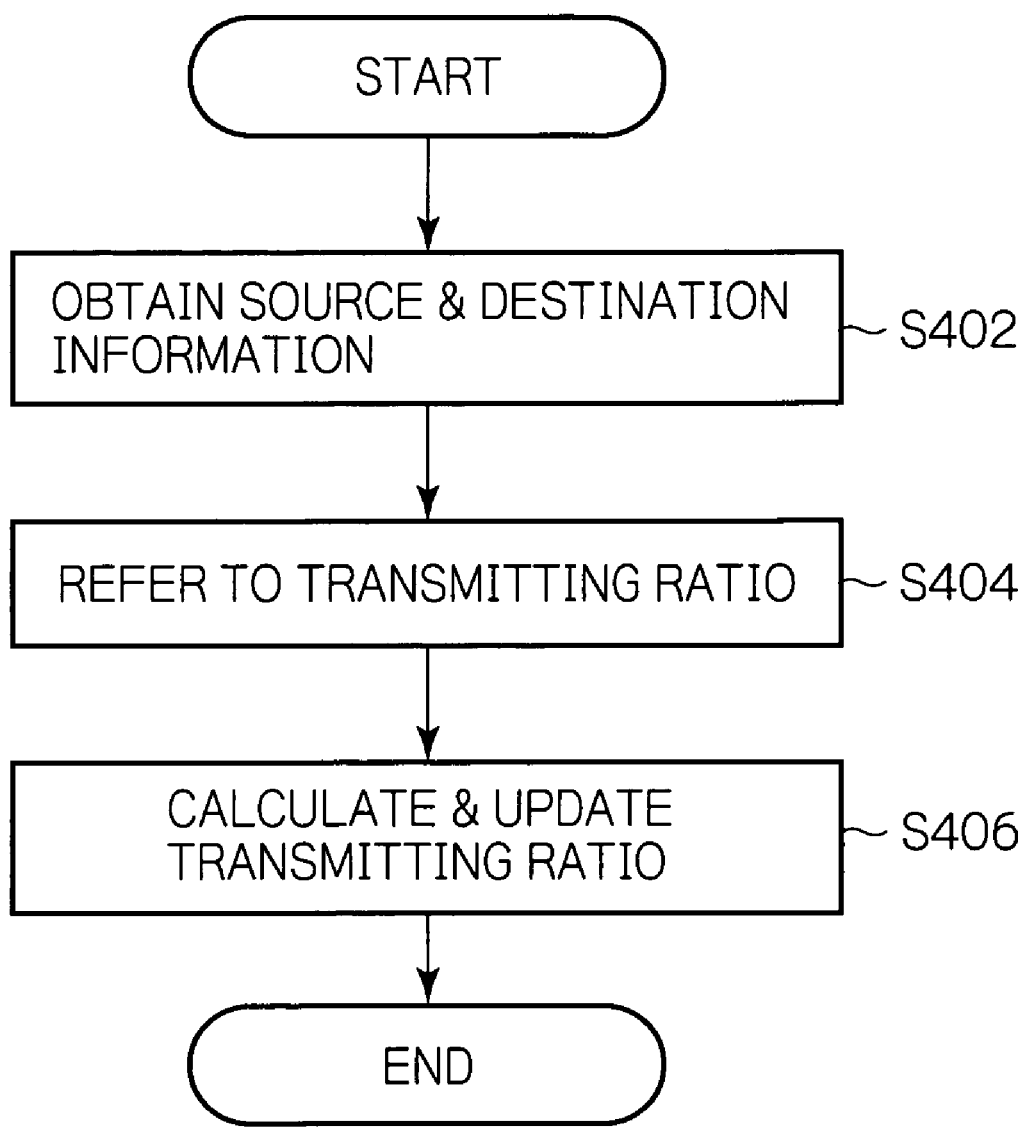
FIG. 11 is a flowchart useful for understanding the process flow of the transmitting ratio calculator shown in FIG. 4.
Figure 12:
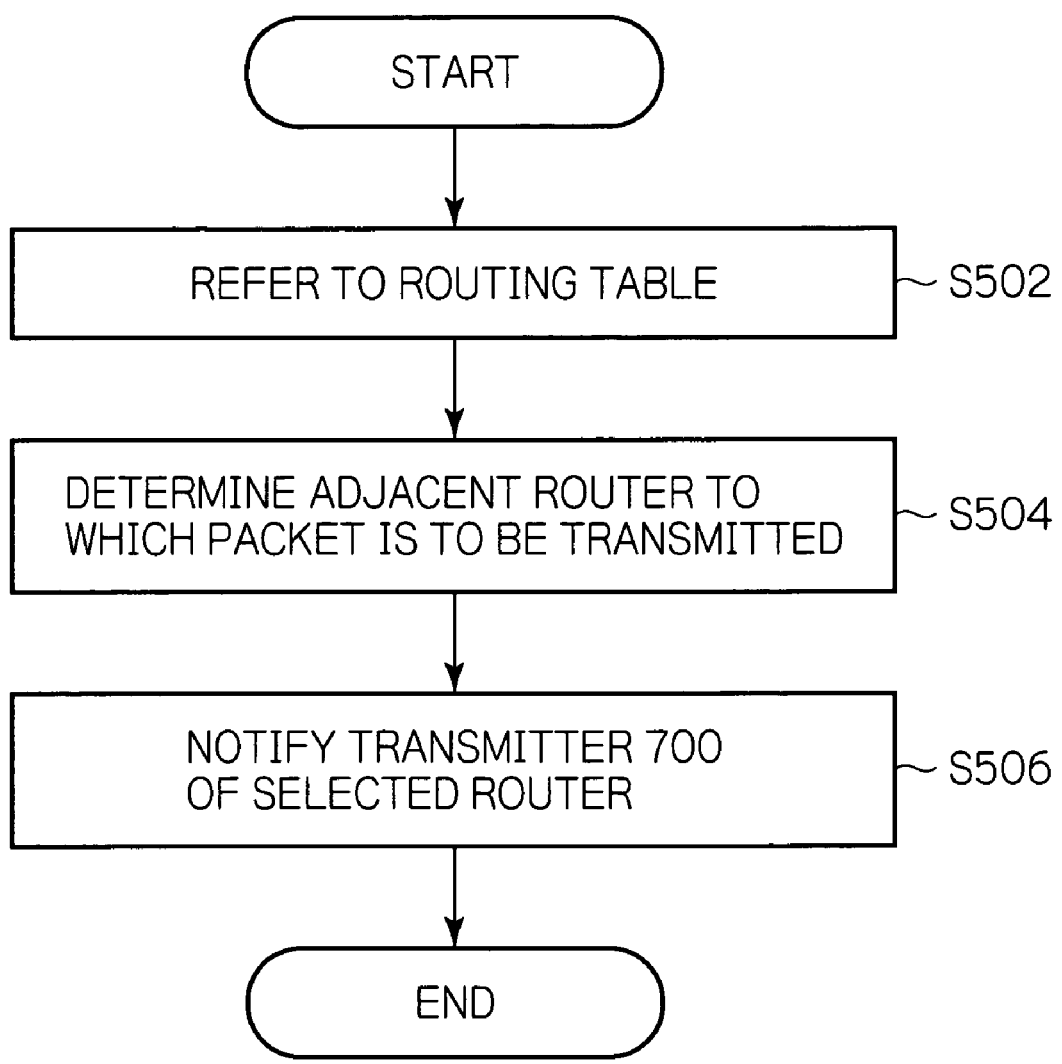
FIG. 12 is a flowchart useful for understanding the process flow of processing ACK packets by the route selector shown in FIG. 4.
Figure 13:
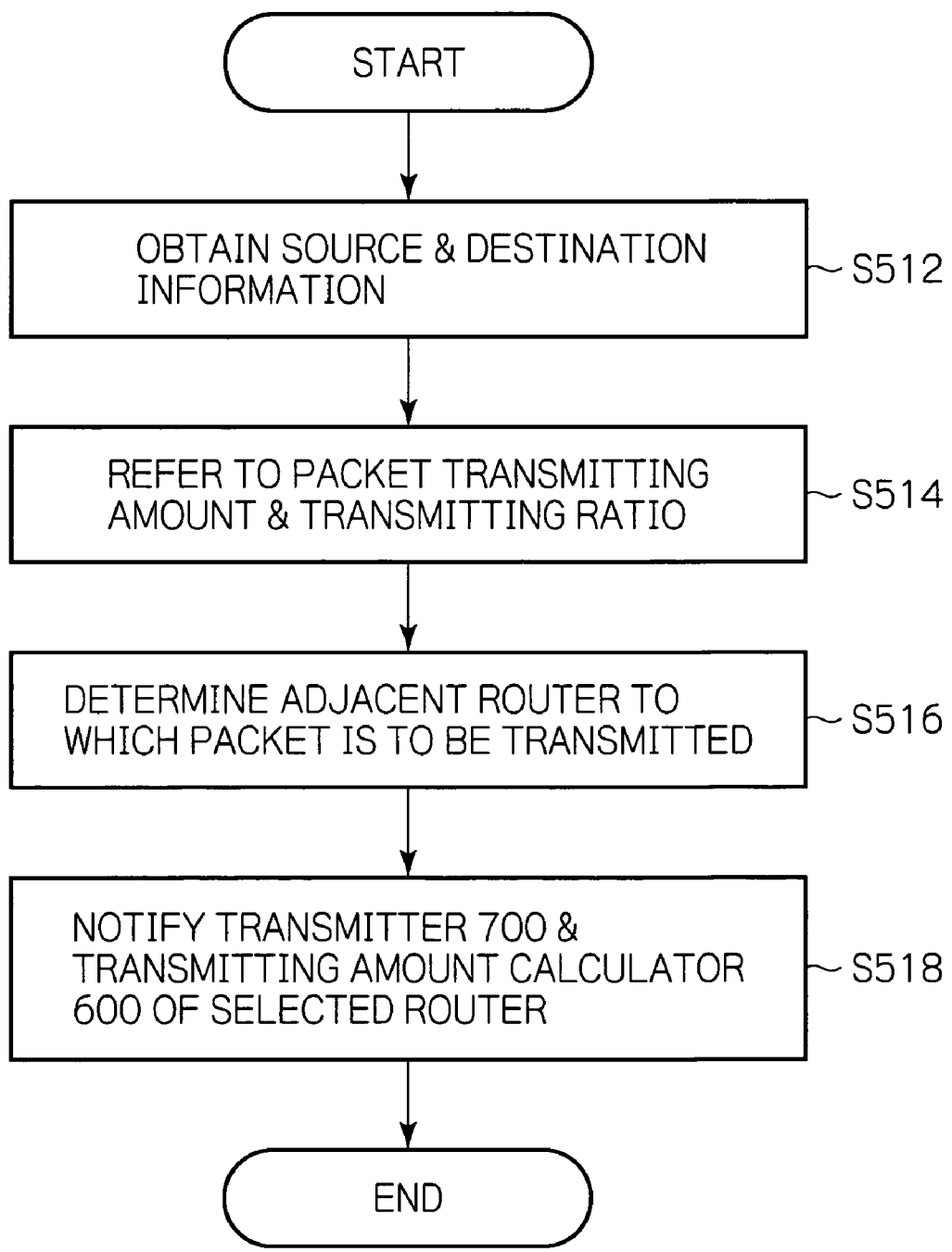
FIG. 13 is a flowchart useful for understanding the process flow of processing data packets by the route selector shown in FIG. 4.
Figure 14:
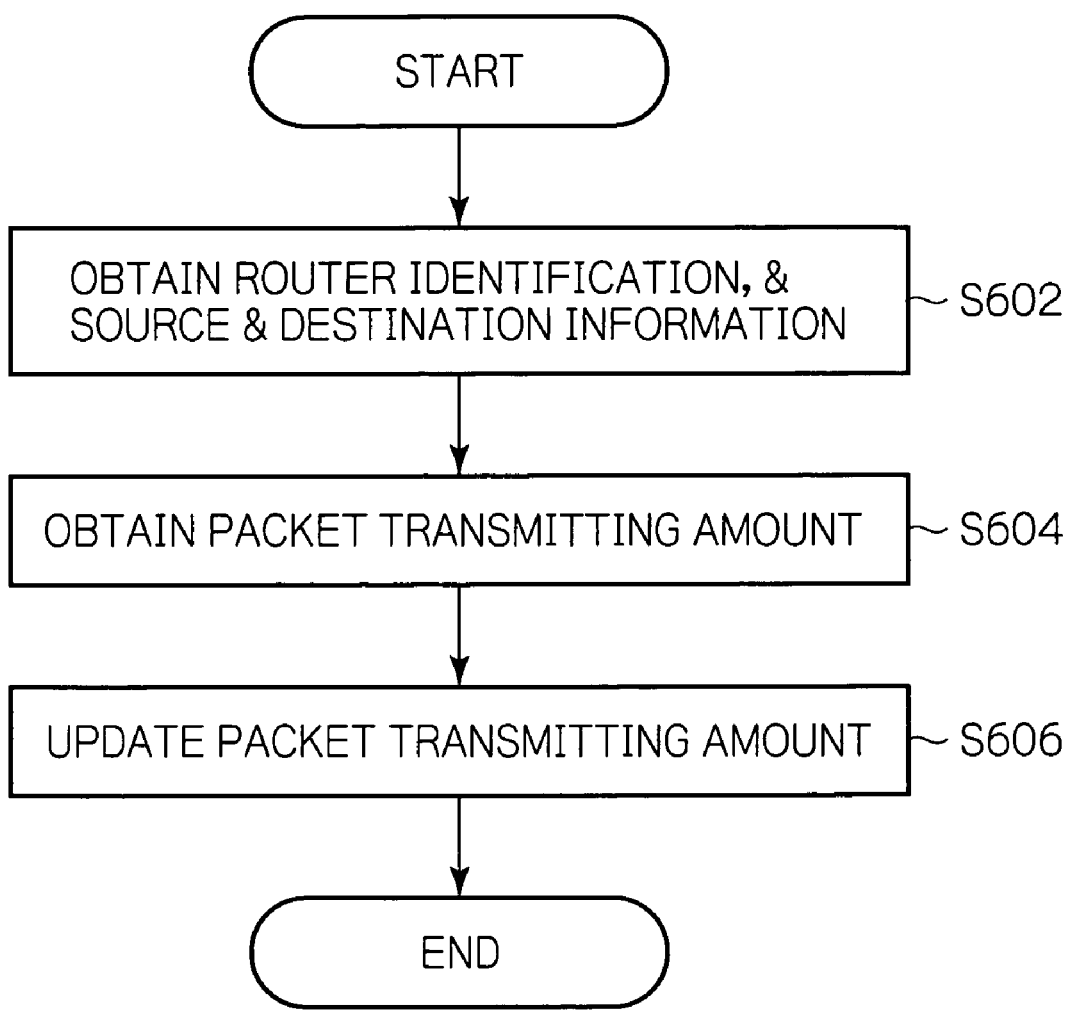
FIG. 14 is a flowchart useful for understanding the process flow of the transmitting amount calculator shown in FIG. 4.

If the received packet is an ACK packet, then the receiving ratio calculator 300 of the packet transfer path controller 100 will perform a receiving ratio calculation step S106. The receiving ratio calculation step S106 will be described in detail with reference to FIG. 10. In FIG. 10, the receiving ratio calculator 300 receives the router identification, source and destination information 204 from the receiver 200 (S302). Next, the receiving ratio calculator 300 refers to receiving ratio information 804, stored in the storage 800, associated with a combination of that source and destination information 204 (S304), and adds information about the packet currently received to the receiving ratio information thus referred to to thereby calculate a receiving ratio to update the receiving ratio information 804 in the storage 800 (S306).

Following the above-described receiving ratio calculation step S106 thus completed, the transmitting ratio calculator 400 of the packet transfer path controller 100 proceeds to a transmitting ratio calculation step S108. The transmitting ratio calculation step S108 will be described in detail with reference to FIG. 11. At first, the transmitting ratio calculator 400 receives the source and destination information from the receiver 200 (S402). Next, the transmitting ratio calculator 400 references the transmitting ratio information 806 in the storage 800 (S404), and calculates a transmitting ratio in one of the update methods described earlier to update the transmitting ratio information 806 in the storage 800 (S406).

After the above-described transmitting ratio calculation step S108 thus completed, the route selector 500 of the packet transfer path controller 100 will perform an ACK packet route or path selecting step S110. The ACK packet route selecting step S110 will be described in detail with reference to FIG. 12. In this example, the received packet is the ACK packet, as described above. In turn, the route selector 500 refers to the routing table (S502), and determines an adjacent router to which the ACK packet is to be transmitted with reference to the routing table (S504). In the exemplified case where the routing table 802 shown in FIG. 5 is directed to the router R2 on the network shown in FIG. 1, if the router R2 receives an ACK packet whose source and destination are the hosts H2 and H1, respectively, the table 802 shows that the ACK packet is to be transmitted to the router R1 indicated in the column "next hop node". After determining the adjacent router to which the ACK packet is to be sent, the route selector 500 sends information 208 about the selected adjacent router to the transmitter 700, namely notifies the transmitter 700 of the identification of the selected router (S506).

After the above-described ACK packet route selecting step S110 thus completed, the transmitter 700 of the packet transfer path controller 100 transmits the received packet 210 to the network (S112), more specifically to the adjacent router selected at the ACK packet route selecting step S110.

Returning now to FIG. 9, at step 104, if the packet received is a data packet, then the route selector 500 of the packet transfer path controller 100 proceeds to a data packet route selecting step S114. The data packet route selecting step S114 will be described in detail with reference to FIG. 13. Now, the route selector 500 receives the source and destination information 206 from the receiver 200 (S512). In turn, the route selector 500 obtains from the storage 800 information on the packet transmitting amount 808 and the transmitting ratio 806, for each adjacent router, associated with data packets having the source and destination thereof corresponding to the source and destination information thus received (S514).

Then, the route selector 500 determines, or selects, an adjacent router to which the data packet is to be transmitted such that the transmitting ratio 806 for the packet transmitting amount 806 thus obtained for each adjacent router will reach the obtained value of the transmitting ratio (S516). For example, when that the packet transmitting amount information 808 is as shown in FIG. 8 while the transmitting ratio information 806 is currently as shown in FIG. 7, the route selector 500 can find that the router R2 has so far transmitted 19 packets to the router R4 and 10 packets to the router R5. In this case, in order to render the transmitting ratios for the transmitting amount of data packets reach the values of transmitting ratios for the adjacent routers shown in FIG. 7, it will be understood that the router R2 may transmit data packets to the router R4. After selecting the adjacent router to which the packet is to be transmitted, the route selector 500 sends the identification information 208 and 212 of the selected router to the transmitter 700 and the transmitting amount calculator 600, respectively, namely, notifies the transmitter 700 and the transmitting amount calculator 600 of the identification of the selected router (S518).

When the data packet route selecting step S114 completes, the transmitting amount calculator 600 of the packet transfer path controller 100 will perform a packet transmitting amount calculation step S116. The packet transmitting amount calculation step S116 will be described in detail with reference to FIG. 14. At first, the transmitting amount calculator 600 receives from the route selector 500 the identification information 212 of the selected adjacent router to which the packet is to be transferred, and the source and destination information from the receiver 200 (S602). Then, the transmitting amount calculator 600 obtains from the storage 800 packet transmitting amounts associated with a combination of the source and the destination indicated by the information thus received (S604).

Then, the transmitting amount calculator 600 updates the packet transmitting amount information 808 with the identification information 214 of the selected adjacent router provided by the route selector 500. More specifically with reference to FIGS. 7 and 8 showing the illustrative example described earlier, the route selector 500 selects the adjacent router R4 to which the data packet is to be transmitted, so that the packet transmitting amount indicated by the item "packet transmitting amount" 8088 is updated from "19" to "20", where the source of the data packet is the host H1 indicated by the item "destination" 8082, the destination is the host H2 indicated by the item "destination" 8084 and the selected adjacent router is the router R4 indicated by the item "router" 8086 (S606).

After the packet transmitting amount calculation step S116 thus completed, the transmitter 700 of the packet transfer path controller 100 transmits the received packet 210 (S112), specifically to the adjacent router selected at the data packet route selecting step S114.

Now, description will be made on a specific behavior of the routers on the network configuration shown in FIGS. 1, 2 and 3. Although the packet transfer path controller 100 has been so far overviewed above with reference to FIGS. 1, 2 and 3, the behavior of the routers on the network will be described in a time serial order together with the behavior of the packet transfer path controller 100 also with reference to those figures.

The telecommunications network shown in FIGS. 1, 2 and 3 includes the routers R1 to R7, and is connected to the hosts H1 and H2. The routers R1 to R7 include the packet transfer path controllers 100 according to the instant illustrative embodiment. Packets that have the source and destination thereof indicative of the hosts H1 and H2, respectively, are transmitted to the host H2 via some of the routers R1 to R7. Packets that have the source and destination thereof indicative of the hosts H2 and H1, respectively, are transmitted to the host H1 also via some of the routers R1 to R7.

When data packets are transmitted from the host H1 to the host H2, one ACK packet is returned from the host H2 to the host H1 in response to each of the data packets. In the routers R1 to R7, the transmitting ratios of data packets are determined on the basis of the receiving ratios of ACK packets. However, prior to a router receiving an ACK packet, the router selects one of its adjacent routers which is involved in the shortest path based upon the minimum number of hops to the destination. If the router finds plural adjacent routers with the same minimum number of hops, then the router distributes the received ACK packets evenly in number between such adjacent routers to which they are to be transferred. For example, if three ACK packets are transmitted from the host H2 to the host H1, the router R7 transmits one packet to each of the routers R4, R5 and R6. The same can be applied when a router receives a data packet but transmitting ratios between that router and its adjacent routers have not yet been determined.

It is assumed that the routing tables for the routers R1 to R7 have already been completed. An example of routing table for the router R2 is shown in FIG. 5, where, as described earlier, the item "metric" shows the minimum number of hops from the router R2 to a destination. The receiving ratio regarding ACK packets, which have been received by a router Ri of interest from its adjacent router Rj and are transmitted from the host H2 and meant for the host H1, is represented by $\alpha_{i,j}$, where i and j are natural numbers between 1 and 7, inclusive. It is also assumed that the initial value of $\alpha_{i,j}$ is set to zero. Therefore, the initial values of transmitting ratios $\alpha_{2,4}$ and $\alpha_{2,5}$ for the router R2 are zero.

Similarly, the transmitting ratio regarding data packets, which are to be transferred by a router Ri to its adjacent router Rj and is transmitted from the host H1 and destined to the host H2, is represented by $\beta_{i,j}$. As mentioned above, in the initial state, the route selector 500, when finding plural adjacent routers involving the same number of hops, evenly distributes data packets between those adjacent routers to which they will be transferred. Therefore, regarding the router R2, the initial values of transmitting ratios $\beta_{2,4}$ and $\beta_{2,5}$ are 0.5.

Similarly, the packet transmitting amount regarding data packets, which are forwarded by a router Ri to its adjacent router Rj and transmitted from the host H1 and destined to the host H2, is represented by $x_{i,j}$, where the initial value of $x_{i,j}$ is zero. Therefore, regarding the router R2, the initial values of transmitting ratios $x_{2,4}$ and $x_{2,5}$ are 0.5.

In order to describe the behavior of the router R2 when data packets are transmitted from the host H1 to the host H2 and ACK packets are returned from the host H2 to the host H1 as shown in FIGS. 1, 2 and 3, the initial values of parameters, such as the receiving ratio, transmitting ratio and packet transmitting amount, have been described above. In addition to those, there are other parameters regarding the router R2 stored in the data storage 800. They may be the transmitting ratio $\beta_{2,1}$ regarding data packets, which are forwarded by the router R2 to the adjacent router R1 and transmitted from the host H2 and destined to the host H1, the receiving ratio $\alpha_{2,1}$ regarding ACK packets, which have been received by the router R2 from the adjacent router R1 and transmitted from the host H1 and destined to the host H2, and the packet transmitting amount $x_{2,1}$ regarding data packets, which are transferred by the router R2 to the adjacent router R1 and transmitted from the host H2 and destined to the host H1. However, because these parameters have little relevant to the behavior of the router R2 that will be described hereinafter, the description about those parameters is omitted.

Under the initial condition stated above, when sixty data packets are transmitted from the host H1 to the host. H2, the numbers of data packets transmitted over the links on the network are shown in FIG. 1 on a link-by-link basis. As described above, the route selector 500 selects one of its adjacent routers which is involved in the shortest path based upon the minimum number of hops to a destination, and if the router finds plural adjacent routers with the same minimum number of hops then the router distributes the received ACK packets evenly in number between such adjacent routers to which they are to be transferred. The host H2, when having received sixty data packets, returns ACK packets to the host H1. The numbers of the ACK packets transmitted under that situation over the links on the network are shown in FIG. 2 on a link-by-link basis.

Processes performed by the router R2 in this case will be described hereinafter. At first, when the router R2 receives an ACK packet from the router R4, the receiver 200 of the router R2 determines that the packet received from the router R4 is an ACK packet. Then, the receiver 200 informs the receiving ratio calculator 300 of the received packet being an ACK packet. Specifically, the receiver 200 sends the router identification information 204 of the router R4 to the receiving ratio calculator 300. In addition, the receiver 200 refers to the IP addresses or the like of the ACK packet and can thus find that the ACK packet has its source and destination indicative of the hosts H2 and H1, respectively. The receiver 200 then sends the two pieces of information 204 to the receiving ratio calculator 300, the transmitting ratio calculator 400, the route selector 500 and the transmitting amount calculator 600.

The receiving ratio calculator 300 in turn obtains router information indicating the router R4, source information indicating the host H2 and destination information indicating the host H1 from the receiver 200. The receiving ratio calculator 300 references the storage 800 to further obtain the receiving ratios regarding a combination of the source and the destination corresponding to the hosts H2 and H1, respectively. In this point in time, the receiving ratios take the initial values thereof, i.e. the receiving ratios $\alpha_{2,4}$ and $\alpha_{2,5}$ are equal to 0. The receiving ratio calculator 300 refers to the receiving ratios being the initial values thereof and information on the reception of one packet from the router R4 to update the receiving ratios 804 in the storage 800, with the result that $\alpha_{2,4}=1$ and $\alpha_{2,5}=0$.

The transmitting ratio calculator 400 obtains source information indicating the host H2 and destination information indicating the host H1 from the receiver 200. The transmitting ratio calculator 400 references the storage 800 to obtain the receiving ratios $\alpha_{2,4}$ and $\alpha_{2,5}$ regarding the combination of the source and the destination corresponding to the hosts H2 and H1, respectively, and the transmitting ratios $\beta_{2,4}$ and $\beta_{2,5}$ regarding the combination of the source and the destination corresponding to the hosts H1 and H2, where $\alpha_{2,4}=1$, $\alpha_{2,5}=0$ and $\beta_{2,4}=\beta_{2,5}=0.5$. Next, the transmitting ratio calculator 400 updates the transmitting ratios with the corresponding receiving ratios in the method of updating transmitting ratios, with the result that $\beta_{2,4}=1$ and $\beta_{2,5}=0$.

The route selector 500 now refers to the routing table 802 in the storage 800 shown in FIG. 5. Since the received packet has its destination indicative of the host H1, the route selector 500 consults with the item "next hop node" 8026 by means of the destination to thereby find that the router R1 is the only adjacent router to which the packet is to be transferred. Next, the route selector 500 sends information on the adjacent router thus determined to the transmitter 700. The transmitter 700 then transmits the packet to the router R1 according to the information sent from the route selector 500.

The router R2 repeats the process stated above every time it receives a packet. Ultimately, the router R2 results in processing thirty packets composed of twenty packets transmitted from the router R4 and ten packets transmitted from the router R5, and transmits them to the router R1, with the result that the receiving ratios $\alpha_{2,4}=2/3$ and $\alpha_{2,5}=1/3$, and the transmitting ratios $\beta_{2,4}=2/3$ and $\beta_{2,5}=1/3$. The final states of the receiving and transmitting ratios are shown in FIGS. 6 and 7, respectively.

As described above, when receiving ratios regarding ACK packets are used to update transmitting ratios regarding data packets and thereafter sixty data packets are transmitted from the host H1 to the host H2, the final numbers of data packets transmitted over the links on the network in accordance with the transmitting ratios thus updated are shown in FIG. 3 as an example on a link-by-link basis.

In the exemplified case, it will be described below how the router R2 processes a data packet when the router R2 receives the data packet from the router R1 for the first time. At first, the receiver 200 of the router R2 determines that the received packet is a data packet. The receiver 200 can find from the IP address or the like of the packet that its source and destination are the hosts H1 and H2, respectively. The receiver 200 sends these two pieces of information to the route selector 500 and the transmitting amount calculator 600.

Next, the route selector 500 obtains source and destination information indicating the hosts H1 and H2, respectively, from the receiver 200. The route selector 500 then references the storage 800 to obtain the packet transmitting amounts $x_{2,4}$ and $x_{2,5}$ regarding a combination of the source and the destination corresponding to the hosts H1 and H2, respectively, and the transmitting ratios $\beta_{2,4}$ and $\beta_{2,5}$ regarding the same combination, where $x_{2,4}=x_{2,5}=0$, $132,4=2/3$, and $\beta_{2,5}=1/3$. Now, the route selector 500 uses these pieces of information to determine or select the router R4 as an adjacent router to which the data packet is to be transmitted such that packet transmitting amounts regarding adjacent routers may satisfy the transmitting ratios. The route selector 500 then sends information 208 and 212 on the router R4 thus determined to the transmitter 700 and the transmitting amount calculator 600, respectively. The transmitter 700 transmits the packet to the router R4 on the basis of the received information about the adjacent router to which the packet is to be transmitted.

The transmitting amount calculator 600 receives from the receiver 200 the source and destination information 206 indicating the source and destination hosts H1 and H2, respectively, and from the route selector 500 the router information 212 on the router R4. The transmitting amount calculator 600 obtains from the storage 800 the packet transmitting amounts $x_{2,4}$ and $x_{2,5}$ associated with a combination of the source and the destination corresponding to the hosts H1 and H2, where $x_{2,4}=x_{2,5}=0$. The transmitting amount calculator 600 uses the router information received from the route selector 500 to update the packet transmitting amounts, with the result that $x_{2,4}=1$ and $x_{2,5}=0$.

In summary, on the packet transfer network formed by routers equipped with the packet transfer path controller according to the illustrative embodiment, data packets to be processed are evenly distributed between the routers R2 and R3 that have an equal number of hops viewed from the source host H1. The same can be said between the routers R4, R5 and R6 that have an equal number of hops viewed from the source host H1. Therefore, a router, such as the router R5 shown in FIG. 3, located at a junction of plural paths, deals with almost, or substantially, the same number of packets as other routers that have the same number of hops. As a result, the possibility of packets arriving at a destination in the order different from the order in which they were transmitted is minimized, as would otherwise be caused by delay at some router or routers on which some packets could be concentrated.

Although the present invention has been described with reference to the accompanying drawings showing a specific configuration of the network in the preferred embodiment, it can be also applied to other types of configurations of telecommunications networks. For example, the invention may generally be applied to a P2P (peer-to-peer) virtual network system, or in another aspect a system of wireless ad-hoc network, for example.

In addition, it is to be noted that the steps or processes described with reference to the flowcharts of the accompanying drawings may not necessarily be processed in a time series in the order as described but in parallel thereto or separately therefrom. Further, it goes without saying that some of the steps to be processed in a time series in the order as described may be processed in an order appropriately modified depending on conditions.

The entire disclosure of Japanese patent application No. 2009-263186 filed on Nov. 18, 2009, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What I claim is:

1. A communication path control apparatus for use in a communication node forming a packet transfer network together with other communication nodes, said apparatus comprising:
    a receiving ratio calculator that calculates a receiving ratio of first packets received from each of the communication nodes adjacent to the communication node on which said apparatus is provided, the receiving ratio being calculated with respect to each of combinations of a source and a destination involved in the first packets and representing a proportion of a number of the first packets received from each of the adjacent communication nodes to a total number of the first packets received from all of the adjacent communication nodes;
    a transmitting ratio calculator that calculates a transmitting ratio of second packets for each of the adjacent communication nodes on a basis of the receiving ratio calculated for a combination of a source and a destination corresponding to the destination and the source of the second packets, respectively, the transmitting ratio defining a proportion in which the second packets transmitted from a source corresponding to the destination of the first packets and meant for a destination corresponding to the source of the first packets are to be transmitted to one of the adjacent communication nodes; and
    a route selector that selects one of the adjacent communication nodes, to which the second packet is to be transmitted, on the basis of the transmitting ratios calculated.

2. The apparatus in accordance with claim 1, further comprising a transmitting amount calculator that calculates a packet transmitting amount of the second packets on the basis of information on the adjacent communication node selected by said route selector, the transmitting amount being calculated with respect to each of the adjacent communication nodes,
    said route selector selecting one of the adjacent communication nodes to which the second packet is to be transmitted such that the packet transmitting amount calculated satisfies the transmitting ratio.

3. The apparatus in accordance with claim 1, wherein said route selector selects the adjacent communication nodes to which the first packets are to be transmitted such that the first packets will be distributed substantially evenly in number between candidate adjacent communication nodes to which the first packets are to be transmitted.

4. The apparatus in accordance with claim 1, wherein, for the adjacent communication node, said transmitting ratio calculator reduces or increases the transmitting ratio if the transmitting ratio is larger or smaller than the receiving ratio, respectively.

5. The apparatus in accordance with claim 1, wherein said transmitting ratio calculator sets the transmitting ratio and the receiving ratio to be substantially equal to each other for the adjacent communication node.

6. The apparatus in accordance with claim 1, wherein the first packet is an acknowledgement (ACK) packet compliant with a transmission control protocol (TCP), and the second packet is a data packet compliant with the TCP.

7. The apparatus in accordance with claim 1, wherein the first packet is a real-time transport control protocol (RTCP) packet, and the second packet is a real-time transfer protocol (RTP) packet.

8. A method of controlling a communication path in a communication path control apparatus for use in a communication node forming a packet transfer network together with other communication nodes to select a communication node which is adjacent to the communication node having the apparatus provided thereon and to which a packet received from another adjacent communication node is to be transmitted, said method comprising the steps of:
    causing a receiving ratio calculator to calculate a receiving ratio of first packets received from each of the adjacent communication nodes, the receiving ratio being calculated with respect to each of combinations of a source and a destination involved in the first packets and representing a proportion of a number of the first packets received from each of the adjacent communication nodes to a total number of the first packets received from all of the adjacent communication nodes;
    causing a transmitting ratio calculator to calculate a transmitting ratio of second packets for each of the adjacent communication nodes on a basis of the receiving ratio calculated for a combination of a source and a destination corresponding to the destination and the source of the second packets, respectively, the transmitting ratio defining a proportion in which the second packets transmitted from a source corresponding to the destination of the first packets and meant for a destination corresponding to the source of the first packets are to be transmitted to one of the adjacent communication nodes; and
    causing a route selector to select one of the adjacent communication nodes, to which the second packet is to be transmitted, on the basis of the transmitting ratios calculated.

9. A packet transfer network including a plurality of communication nodes, each of which includes a communication path control apparatus comprising:
    a receiving ratio calculator that calculates a receiving ratio of first packets received from each of the communication nodes adjacent to the communication node on which said apparatus is included, the receiving ratio being calculated with respect to each of combinations of a source and a destination involved in the first packets and representing a proportion of a number of the first packets received from each of the adjacent communication nodes to a total number of the first packets received from all of the adjacent communication nodes;

a transmitting ratio calculator that calculates a transmitting ratio of second packets for each of the adjacent communication nodes on a basis of the receiving ratio calculated for a combination of a source and a destination corresponding to the destination and the source of the second packets, respectively, the transmitting ratio defining a proportion in which the second packets transmitted from a source corresponding to the destination of the first packets and meant for a destination corresponding to the source of the first packets are to be transmitted to one of the adjacent communication nodes; and a route selector that selects one of the adjacent communication nodes, to which the second packet is to be transmitted, on the basis of the transmitting ratios calculated.

* * * * *